(12) United States Patent
Arimitsu (10) Patent No.: US 6,888,330 B2
(45) Date of Patent: May 3, 2005

(54) CURRENT CONTROLLING METHOD AND APPARATUS FOR ELECTRIC ROTATING MACHINE

(75) Inventor: Minoru Arimitsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 28 days.

(21) Appl. No.: 10/361,559

(22) Filed: Feb. 11, 2003

(65) Prior Publication Data

US 2003/0155876 A1 Aug. 21, 2003

(30) Foreign Application Priority Data

Feb. 21, 2002 (JP) .................................... 2002-044662

(51) Int. Cl.[7] .......................... H02K 16/02; H02P 7/00
(52) U.S. Cl. ................................ 318/433; 318/495
(58) Field of Search .............................. 318/432–433, 318/491, 494–495, 629

(56) References Cited

U.S. PATENT DOCUMENTS

| 4,163,928 | A | * | 8/1979 | Patterson et al. | ......... 318/573 |
| 4,739,201 | A | * | 4/1988 | Brigham et al. | ......... 310/49 R |
| 5,053,689 | A | * | 10/1991 | Woodson et al. | ......... 318/705 |
| 5,189,357 | A | * | 2/1993 | Woodson et al. | ......... 318/737 |
| 5,589,746 | A | * | 12/1996 | Lewis | ......... 318/439 |
| 5,886,493 | A | | 3/1999 | Ueda et al. | |
| 6,376,955 | B1 | | 4/2002 | Arimitsu | |
| 6,674,262 | B2 | * | 1/2004 | Kitajima et al. | ......... 318/722 |
| 6,710,495 | B2 | * | 3/2004 | Lipo et al. | ......... 310/184 |
| 6,727,675 | B2 | * | 4/2004 | Yoshimoto et al. | ......... 318/700 |
| 2001/0020805 | A1 | | 9/2001 | Nakano et al. | |

FOREIGN PATENT DOCUMENTS

| EP | 0 945 963 A2 | 9/1999 |
| JP | 8-340663 A | 12/1996 |
| JP | 11-275826 A | 10/1999 |
| JP | 11-356015 A | 12/1999 |
| JP | 2001-231227 A | 8/2001 |

OTHER PUBLICATIONS

J.M. Stephenson et al., "Torque ripple minimisation in a switched reluctance motor by optimum harmonic current injection", IEE Proceedings: Electric Power Applications, Institution of Electrical Engineers, vol. 148, No. 4, Jul. 6, 2001, pp. 322–328.

* cited by examiner

Primary Examiner—Bentsu Ro
(74) Attorney, Agent, or Firm—Foley & Lardner LLP

(57) ABSTRACT

In method and apparatus for controlling a current of an electrical rotating machine, at least one high-order higher harmonic wave current is superposed on a fundamental wave current, the high-order higher harmonic wave current having current components one phase of which is different by 90 [el. deg] from a high-order high harmonic wave component included in a magnetic flux distribution generated by at least one magnet of the rotating machine and the other phase of which is the same as that of the high-order higher harmonic wave component included therein and the high-order harmonic wave current component is superposed on the fundamental wave current to the rotating machine.

11 Claims, 9 Drawing Sheets

FIG.1A

FIG.1B
3-PHASE OUTER ROTOR TWO PAIRS OF POLES

FIG.1C
6-PHASE INNER ROTOR ONE PAIR OF POLES

CURRENT CONTROLLING METHOD AND APPARATUS FOR ELECTRIC ROTATING MACHINE

BACKGROUND OF THE INVENTION

1. Field of the Invention

The present invention relates to current controlling method and apparatus for an electric rotating machine such as a compound motor.

2. Description of the Related Art

A Japanese Patent Application First Publication No. Heisei 11-356015 published on Dec. 24, 1999 exemplifies a previously proposed rotating machine. The previously proposed rotating machine described in the above-described Japanese Patent Application First Publication adopts a three-layer structure of two rotors and a single stator. When a compound (alternating) current synchronized with rotation speeds of the two rotors is caused to flow through the electric rotating machine so that torques generated on the two rotors are respectively non-interfered with each other.

On the other hand, a compound motor is disclosed in a Japanese Patent Application First Publication No. 2001-231227 published on Aug. 24, 2001 (which corresponds to a U.S. patent application publication Ser. No. US2001/0020805 A1 published on Sep. 13, 2001). The disclosed compound motor has two pairs of stator coils and rotors respectively independently operated of each pair of the stator coils and rotors. In the disclosed compound motor, an ineffectual current in a case where the coils of the same polarities at the two stator coils are connected in parallel to each other is controlled so as to improve an entire working efficiency.

SUMMARY OF THE INVENTION

Concentrated windings have often been adopted in the stator coils of generally available motors since number of turns of coils can be reduced thereby so that a reduction of a copper loss can be achieved and a high working efficiency of the motor can be expected. However, in the concentrated windings, higher harmonic wave components appear on a magnetic flux distribution so that a distortion occurs in the magnetic flux. Thus, only a fundamental wave component on the magnetic flux distribution can be utilized due to the presence of distortion in the magnetic flux distribution by the flow of the current synchronized with a rotor revolution speed. Consequently, a current capacity required for a certain output torque is increased, viz., the working efficiency of the motor is dropped. This phenomenon becomes more remarkable in a range of high revolution range of the rotor. In addition, in the compound motor as is disclosed in the Japanese Patent Application First Publication No. 2001-231227, distortions occur on the magnetic fluxes of the respective motors and, as a result of this, the current capacity is increased since only the fundamental wave components are used.

It is, hence, an object of the present invention to provide current controlling method and apparatus for an electric rotating machine in which an effective use of the higher harmonic wave components of the magnetic flux distributions can be made to improve the working efficiency.

According to a first aspect of the present invention, there is provided a method for controlling a current of an electrical rotating machine, comprising: superposing at least one high-order higher harmonic wave current on a fundamental wave current, the high-order higher harmonic wave current having current components one phase of which is different by 90 [el. deg] from a high-order high harmonic wave component included in a magnetic flux distribution generated by at least one magnet of the rotating machine and the other phase of which is the same as that of the high-order higher harmonic wave component included therein; and supplying the high-order harmonic wave current component superposed on the fundamental wave current to the rotating machine.

According to a second aspect of the present invention, there is provided a method for controlling a current of an electrical rotating machine, the rotating machine comprising a plurality of rotors driven by a compound current, the method comprising: superposing a sum of high-order higher harmonic wave currents having current components whose phases are different by 90 [el. deg] from respective magnetic flux higher harmonic waves caused by at least one magnets present on the respective rotors of the rotating machine and whose phases are the same as those of the respective magnetic flux higher harmonic waves on the compound current which is a sum of fundamental wave currents; and supplying the sum of the high-order higher harmonic wave currents superposed on the sum of the fundamental wave currents in the compound current to the rotating machine.

According to a third aspect of the present invention, there is provided an apparatus for controlling a current of an electrical rotating machine, comprising: a superposing section that superposes at least one high-order higher harmonic wave current on a fundamental wave current, the high-order higher harmonic wave current having current components one phase of which is different by 90 [el. deg] from a high-order high harmonic wave component included in a magnetic flux distribution generated by at least one magnet of the rotating machine and the other phase of which is the same as that of the high-order higher harmonic wave component included therein; and a supplying section that supplies the high-order harmonic wave current component superposed on the fundamental wave current to the rotating machine.

According to a fourth aspect of the present invention, there is provided an apparatus for controlling a current of an electrical rotating machine, the rotating machine comprising a plurality of rotors driven by a compound current, the method comprising: a superposing section that superposes a sum of high-order higher harmonic wave currents having current components whose phases are different by 90 [el. deg] from respective magnetic flux higher harmonic waves caused by magnets present on the respective rotors of the rotating machine and whose phases are the same as those of the respective magnetic flux higher harmonic waves on the compound current which is a sum of fundamental wave currents; and a supplying section that supplies the sum of the high-order higher harmonic wave currents superposed on the sum of the fundamental wave currents in the compound current to the rotating machine.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1A:
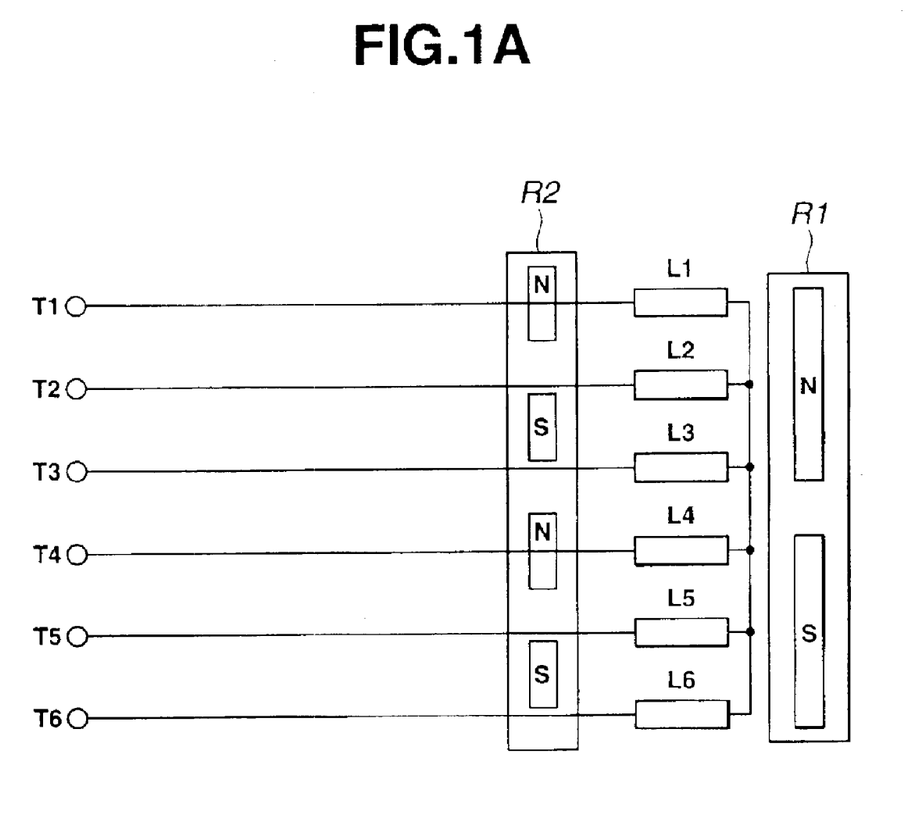
FIG. 1A is a diagrammatical view of an example of a coaxial motor.
Figure 1B:
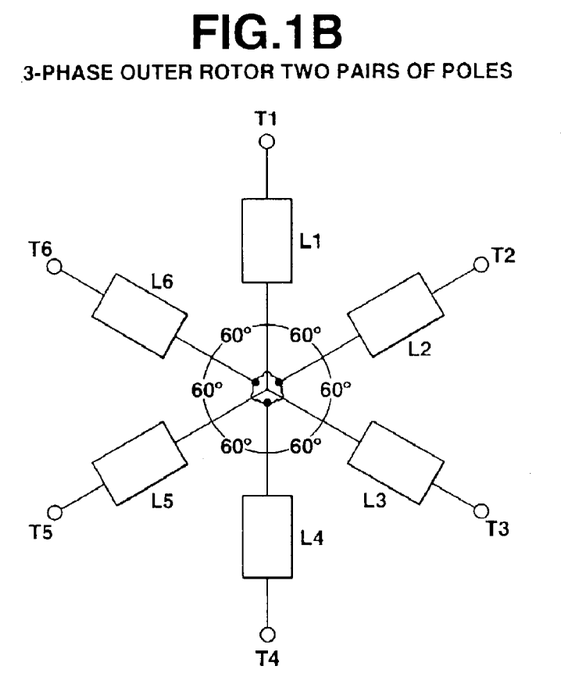
FIGS. 1B and 1C are connection diagrams of stator coils for outer and inner rotors shown in FIG. 1A, respectively.
Figure 1C:
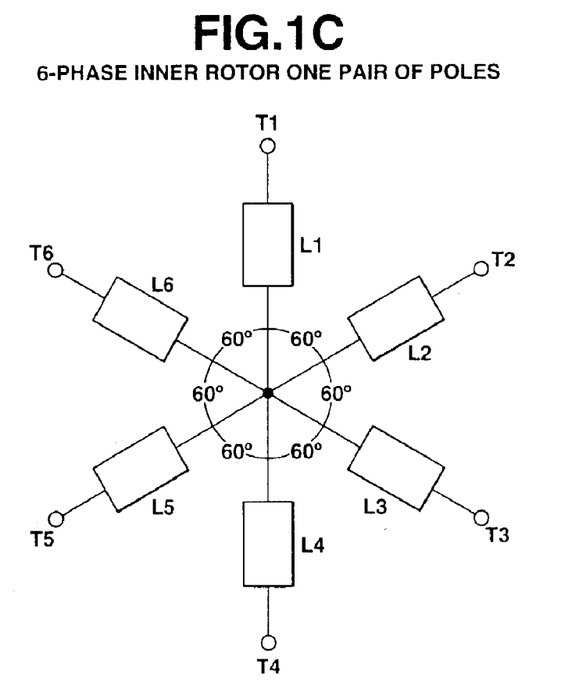
Figure 1D:
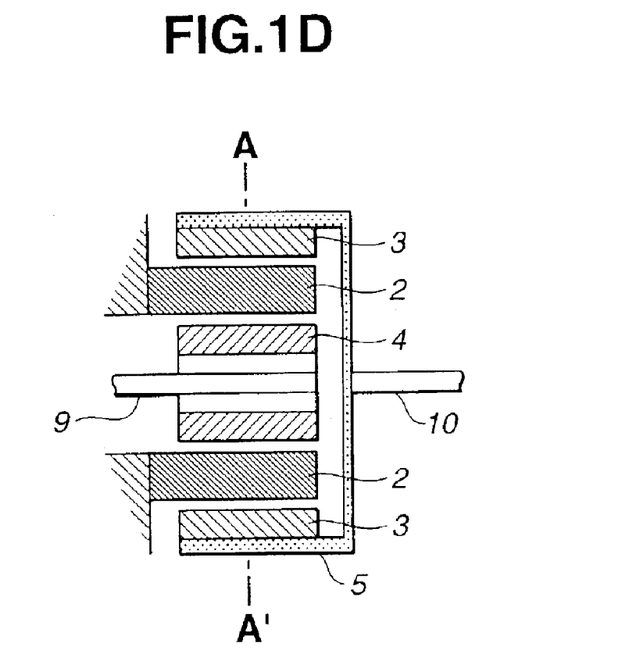
FIG. 1D is a cross sectional view of the coaxial motor shown in FIG. 1A.
Figure 1E:
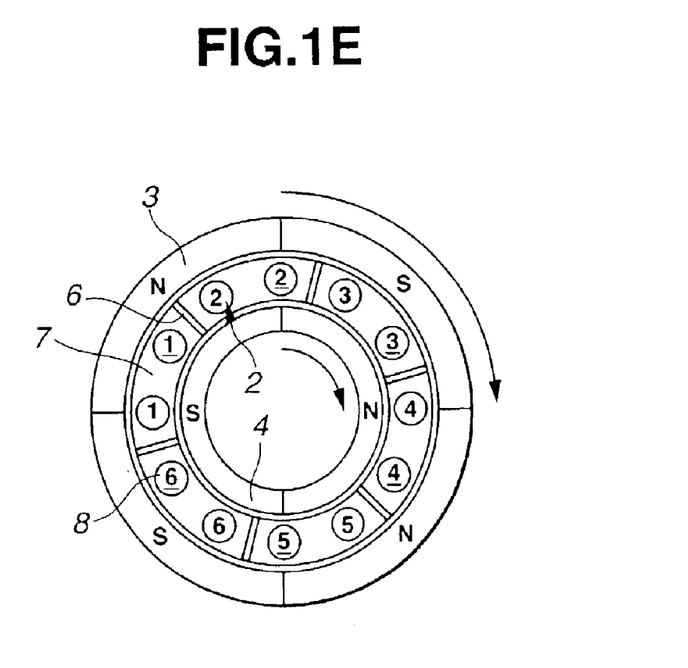
FIG. 1E is a cross sectional view of the coaxial motor cut away along a line A–A' in FIG. 1D.

FIGS. 1A, 1B, 1C, 1D, and 1E show a coaxial motor driven with a compound (alternating) current to which a current controlling method according to the present invention is applicable. The coaxial motor shown in FIG. 1A has an outer rotor R2 of a three-phase two pairs of poles, for example, as shown FIG. 1B, an inner rotor R1 of a six-phase one pair of poles, for example, as shown in FIG. 1C, and six stator slots. As shown in FIG. 1A, coils L1 through L6 are wound around each slot of the stator slots. Terminals T1 through T6 of each coil L1 through L6 are connected to an inverter 6A (36) as will be described later. As typically shown in FIG. 1E, outer rotor R2 (a reference numeral 3 in FIGS. 1D and 1E) two pair of poles (N (North) poles are two and adjacent S (South) poles are two) and inner rotor R1 (a reference numeral 4 in FIGS. 1D and 1E) has one pair of poles. It is noted that a reference numeral 2 in FIGS. 1D and 1E denotes the stator. A numeral enclosed by a circle shown in FIG. 1E denotes a winding of each coil. For example, numerals 1 and 1 constitute a single coil 8 and directions of the current are reversed. For example, 1 denotes a winding arranged in such a way that the current is caused to flow toward a sheet surface direction and 1 denotes another winding arranged in such a way that the current is caused to flow toward an anti-sheet surface direction (opposite to the sheet surface direction). In this case, a total of six coils L1 through L6 are formed on stator 2. In addition, a reference numeral 7 shown in FIG. 1E denotes each core on which the corresponding coil 8 is wound. The same number of cores 7 as the coils are arranged equally at a predetermined gap 6 on a circumference of stator 2. A reference numeral 10 in FIG. 1D denotes an outer rotor shaft and a reference numeral 9 in FIG. 1E denotes an inner rotor shaft mounted so as to be the same axis as outer rotor shaft 10. In addition, a reference numeral 5 in FIG. 1D denotes a housing. It is noted that FIG. 1E is a cross sectional view cut away along a line A–A' shown in FIG. 1D.

First, explained below is concerned with a comparative example to a current controlling method according to the present invention. Currents are caused to flow from terminals T1 through T6 in synchronization with respective revolutions of both rotors R1 and R2. In the comparative example, a current on which only fundamental wave currents on the respective rotors R1 and R2 are superposed has been caused to flow. On the other hand, there are many cases in which magnetic flux distributions caused by magnets on rotors are distorted. The following calculation equations indicate a relationship between a torque and a supplied current. It is noted that herein describes only the current for inner rotor R1 (or 4).

$$I_k = I_1 \cos(\theta - \pi k/3 - \alpha) \qquad (1).$$

In equation (1), k=0 through 5, α denotes an initial phase, θ denotes an electrical angle, and $I_1$ denotes an amplitude. Suppose that, in the magnetic flux of each coil in stator 2, a fifth-order higher harmonic is included as described in the following equation (2).

$$\phi_k = \phi_1 \cos(\theta - \pi k/3) + \phi_5 \cos(5\theta - 5\pi k/3 - \beta) \qquad (2).$$

In equation (2), β denotes an initial phase. A torque developed herein (corresponding to the magnet) is expressed in the following equation.

$$\begin{aligned}
\tau &= \sum_{k=0}^{5} \frac{\partial \phi k}{\partial \theta} i k \\
&= \sum_{k=0}^{5} I_1 \phi_1 \cos\left(\theta - \frac{\pi k}{3}\right) \cos\left(\theta - \frac{\pi k}{3} - \alpha\right) + \\
&\quad \sum_{k=0}^{5} I_1 \phi_5 \cos\left(\theta - \frac{\pi k}{3} - \alpha\right) \cos\left(5\theta - 5\frac{\pi}{3}k - \beta\right) \\
&= \frac{I_1 \phi_1}{2} \sum_{k=0}^{5} \left\{ \cos\left(2\theta - \frac{2\pi k}{3} - \alpha\right) + \cos\alpha \right\} + \\
&\quad \frac{I_1 \phi_5}{2} \sum_{k=0}^{5} \left\{ \cos(6\theta - \alpha - \beta) + \cos\left(4\theta - \frac{4\pi}{3}k - \beta + \alpha\right) \right\} \\
&= 3I_1 \phi_1 \cos\alpha + 3I_1 \phi_5 \cos(6\theta - \alpha - \beta).
\end{aligned} \qquad (3)$$

It is noted that, in the torque shown in equation (3), a ripple shown in a second term of a right side of equation (3) is developed. However, an actual torque is important in an average value of equation (6) and the torque obtained in comparative example is as follows:

$$<\tau> = 3I_1 \phi_1 \cos\alpha \qquad (4).$$

Next, the current controlling method according to the present invention which is used for the coaxial motor shown in FIG. 1A will be described. In the current controlling method according to the present invention, a current expressed in the following equation (5) to which a fifth-order higher harmonic wave component is added to the current expressed in equation (1) is caused to flow:

$$I_k = I_1 \cos(\theta - \pi k/3 - \alpha) + I_5 \cos(5\theta - 5k\pi/3 - \gamma) \qquad (5)$$

In equation (5), γ denotes an initial phase. If the torque is calculated in the same way as described in equation (3), the following equation (6) is established.

$$\tau' = \tau + \sum_{k=0}^{5} \phi_1 I_5 \cos\left(\theta - \frac{\pi k}{3}\right) \cos\left(5\theta - \frac{5\pi k}{3} - \gamma\right) + \quad (6)$$

$$\sum_{k=0}^{5} \phi_5 I_5 \cos\left(5\theta - \frac{5\pi k}{3} - \beta\right) \cos\left(5\theta - \frac{4\pi k}{3} - \gamma\right)$$

$$= \tau + \frac{\phi_1 I_5}{2} \left\{ \sum_{k=0}^{5} \cos(6\theta - \gamma) + \cos\left(4\theta - \frac{4\pi k}{3} - \gamma\right) \right\} +$$

$$\frac{\phi_5 I_5}{2} \left\{ \sum_{k=0}^{5} \cos\left(10\theta - \frac{10\pi}{3}k - \gamma - \beta\right) + \cos(\beta - \gamma) \right\}$$

$$= \tau + 3\phi_1 I_5 \cos(6\theta - \gamma) + 3\phi_5 I_5 \cos(\beta - \gamma).$$

Hence, the average value corresponding to equation (3), viz., the torque achieved by the case in which the current controlling method according to the present invention is used can be expressed as follows:

$$<\tau'> = 3I_1\phi_1 \cos\alpha + 3I_5\phi_5 \cos(\beta - \gamma) \quad (7).$$

From equation (7), the torque corresponding to $3I_5\phi_5 \cos(\beta-\gamma)$ largely appears with respect to equation (4). That is to say, the current on which the higher harmonic wave components are superposed is caused to flow and the effective use of the higher harmonic wave component caused by the magnetic flux permits the further augmentation of the torque.

Suppose that $<\tau> = <\tau'> = \tau_{ref}$ in order to review the relationship between currents $I_1$ and $I_5$ to obtain the same torque values in the case of the comparative example and the current controlling method according to the present invention.

$$\tau_{ref} = 3I_1\phi_1 \cos\alpha \quad (8).$$

$$\tau_{ref} = 3I_1\phi_1 \cos\alpha + 3I_5\phi_5 \cos(\beta - \gamma) \quad (9).$$

Substitute $I'_1$ and $I'_5$ into $I_1$ and $I_5$ in equation (9) to achieve $\tau_{ref}$ due to a high-frequency component superposition according to the present invention.

That is to say, $$\tau_{ref} = 3I'_1\phi_1 \cos\alpha + 3I'_5\phi_5 \cos(\beta - \gamma) \quad (10).$$

In order to furthermore simplify equation (10), $\cos\alpha = \cos(\beta - \gamma) = 1$ (correspond to a q axis). At this time, the following simultaneous equations (11) are established from equations (8) and (10) (it is noted that coefficient 3 is omitted). It is noted that q axis denotes a torque component direction axis of an equivalent circuit of the motor and d axis denotes an exciting current direction axis of the equivalent circuit of the motor.

$$\tau_{ref} = I_1\phi_1$$

$$\tau_{ref} = I'_1\phi_1 + I'_5\phi_5 \quad (11).$$

It is noted that $\tau_{ref}$ denotes a target axial torque.

For the lower one of simultaneous equations (11), a combination of $I_1'$ and $I_5'$ is present innumerably. Supposing effective value $I_1'^2 + I_5'^2 \to \min$, a solution is determined uniquely according to Lagrange's indeterminate constant method. Then, $I_1'$ and $I_5'$ are derived as follows:

$$I'_1 = \frac{\phi_1}{\phi_1^2 + \phi_5^2} \tau_{ref} \quad (12)$$

$$I'_5 = \frac{\phi_5}{\phi_1^2 + \phi_5^2} \tau_{ref}.$$

The right sides of upper and lower simultaneous equations of (12) are minimum. Actually, the upper and lower stages of equations (11) are respectively given as:

$$I_1^2 = \frac{\tau_{ref}^2}{\phi_1^2} \quad (13)$$

$$I'^2_1 + I'^2_5 = \frac{\tau_{ref}^2}{\phi_1^2 + \phi_5^2}.$$

As a result, it will be appreciated that, in order to generate the same torque, a use of a higher-order higher harmonic wave component can reduce the current capacity (this means the increase of the working efficiency). Hence, in the current controlling method according to the present invention, a copper loss is apparently reduced. Suppose, for example, that such a motor as $\phi_5 = 0.2$ for $\phi_1 = 1$ is present. In this case, the following equation (14) is established.

(Fundamental wave+copper loss due to fifth-order higher harmonic wave component)/(copper loss due to the current constituted only by the fundamental wave)

$$= 1^2/(1^2 + 0.2^2) = 96\% \quad (14).$$

Consequently, the copper loss can be reduced by 4%.

In the magnetic flux components caused by the magnets in the actual compound motor, high harmonic waves higher than the seventh-order are almost absent. Actually, the fifth-order and seventh-order higher harmonic wave components may be superposed. Actually, if 0.5% spectra to the fundamental wave in an eleventh-order harmonic component is present, an advantage of the current capacity is resulted in $1/(1 \div 0.005)^2 = 99.99\%$. Practically, almost no profit is obtained.

Next, explained herein is that no torque interference between the two rotors occurs even if the higher harmonic wave component is superposed, viz., even if a current component of a frequency having a predetermined multiple of the respective fundamental frequency component of the compound current is supplied to the compound motor. Suppose herein, the coaxial motor shown in FIG. 1A. The fundamental wave component of each current $I_{in}$ and $I_{OUT}$ related to the inner and outer rotors R1 and R2 (4 and 3 in FIGS. 1D and 1E) can be expressed as follows:

$$I_{in} = I_{in} \cos(\theta_1 - \pi k/3 - \alpha) \quad (15).$$

$$I_{OUT} = I_{OUT} \cos(\theta o - 2\pi k/3 - \beta) \quad (16).$$

The magnetic flux components $\phi_{in}$ and $\phi_{out}$ of inner rotor R1 (or 4) and outer rotor R2 (or 3) caused by their magnets will be defined as follows:

$$\phi_{in} = \phi_{in} \cos(\theta_1 - \pi k/3) \quad (17).$$

$$\phi_{out} = \phi_{out} \cos(\theta o - 2\pi k/3) \quad (18).$$

Hence, if the following conditions are satisfied, it can be said that no torque interference between the two rotors occurs. In details, $$Iin = Iin \cos\left(\theta_i - \frac{\pi k}{3} - \alpha\right). \tag{19}$$

$$Iout = Iout \cos\left(\theta o - \frac{2\pi}{3}k - \beta\right). \tag{20}$$

The magnetic flux components of inner rotor R2 and outer rotor R1 caused by their magnets are expressed as follows:

$$\phi in = \phi in \cos(\theta_i - \pi k/3) \tag{21}$$

$$\phi out = \phi out \cos(\theta o - 2\pi k/3) \tag{22}$$

Hence, if the following equation (23) is established, it can be said that the torque interference described above is not present.

$$\sum_{k=0}^{5} \cos\left\{N\left(\theta_i - \frac{\pi k}{3} - \alpha\right)\right\} \cdot \cos\left\{M\left(\theta o - \frac{2\pi k}{3} - \beta\right)\right\} = 0. \tag{23}$$

In this equation (23), N and M denote natural numbers equal to or higher than 1. If the left side of equation (23) is furthermore calculated, the following result is obtained.

$$= \frac{1}{2}\sum_{k=0}^{5} \cos\left\{N\theta_i + M\theta o - \frac{N+2M}{3}\pi k - N\alpha - M\beta\right\} + \tag{24}$$

$$\frac{1}{2}\sum_{k=0}^{5} \cos\left\{N\theta_i + M\theta o - \frac{N-2M}{3}\pi k - N\alpha + M\beta\right\}.$$

Ordinarily, since odd number orders of N=3, 5, _ _ _ and M=3, 5, - - - are dominated, N and M are expressed as follows:

$$N=2n+1, n=1, 2, \text{- - -}; \text{ and } M=2m+1, m=1, 2, \text{- - -}. \tag{25}$$

If this is inserted in a term related to $\pi k$ in the first term at the right side of equation (24), the following equation is established.

$$\frac{N+2M}{3}\pi k = \frac{(2n+1)+(4m+2)}{3}\pi k \tag{26}$$

$$= \frac{2}{3}(n+2m)\pi k + \pi k$$

$$= \frac{5}{3}\pi ki(i = 3 \text{ through } \infty)$$

$$= -60 \times i[\text{el. deg}] \times k.$$

According to this equation (26), the following equalities are established.

$$\sum_{k=0}^{5} e^{-j60ik} = (1 - e^{-j360i})/(1 - e^{-j60i}) \equiv 0. \tag{27}$$

Consequently, the first term of equation (24) is eliminated. Similarly, a second term of equation (24) is also eliminated. Equation (23) is, in this way, established. Hence, it can be said that even if the respectively corresponding high-order harmonic wave components are superposed on the compound current which is the total sum of only fundamental wave components for the respective rotors, no influence is given to the party (opposite) rotor.

Next, a preferred embodiment of the current controlling method according to the present invention will be described.

First, a method of deriving d-axis component and q-axis component of the fifth-order higher harmonic wave current component with respect to the fifth-order magnetic flux will be described in order to perform a feedback control of the current. Suppose that the fifth-order higher harmonic wave current component is superposed on the six-phase alternating current of inner rotor R1 shown in FIGS. 1A and 1C. In order to separate the higher harmonic wave components from the current including the higher harmonic wave components, the following calculation is carried out. The current including the fifth-order higher harmonic wave component as described above can be expressed in the following equation (28).

$$I = I_1 \begin{pmatrix} \cos(\theta - \alpha) \\ \cos(\theta - 60 - \alpha) \\ \cos(\theta - 120 - \alpha) \\ \cos(\theta - 180 - \alpha) \\ \cos(\theta - 240 - \alpha) \\ \cos(\theta - 300 - \alpha) \end{pmatrix} + I_5 \begin{pmatrix} \cos(5\theta - \beta) \\ \cos(5\theta - 60 - \beta) \\ \cos(5\theta - 120 - \beta) \\ \cos(5\theta - 180 - \beta) \\ \cos(5\theta - 240 - \beta) \\ \cos(5\theta - 300 - \beta) \end{pmatrix}. \tag{28}$$

A conversion matrix to a d-q coordinate system will be prescribed as follows. Since the conversion matrix is concerned with the fifth-order higher harmonic component, the phase is multiplied by five. The following equation (30) is derived from the following equation (29) in which higher harmonic order number N is five and the drive phase number M is 6.

$$\begin{pmatrix} \cos N\theta & \cos N\left(\theta - \frac{2\pi}{M}\right) & \text{- - -} & \cos N\left(\theta - \frac{M-1}{M}2\pi\right) \\ -\sin N\theta & -\sin N\left(\theta - \frac{2\pi}{M}\right) & & -\sin N\left(\theta - \frac{M-1}{M}2\pi\right) \end{pmatrix}. \tag{29}$$

$$T \propto \begin{pmatrix} \cos 5\theta & \cos(5\theta + 60) & \text{- - -} & \cos(5\theta + 300) \\ -\sin 5\theta & -\sin(5\theta + 60) & \text{- - -} & -\sin(5\theta + 300) \end{pmatrix}. \tag{30}$$

From equation (30) multiplied by equation (29), (1, 1) component is given as:

$$(1, 1) \text{ component} = I_1 \sum_{k=0}^{5} \cos\left(5\theta + \frac{\pi}{3}k\right)\cos\left(\theta - \frac{\pi}{3}k - \alpha\right) + \tag{31}$$

$$I_5 \sum_{k=0}^{5} \cos\left(5\theta + \frac{\pi k}{3}\right)\cos\left(5\theta + \frac{\pi k}{3} - \beta\right)$$

$$= \frac{I_1}{2}\sum_{k=0}^{5}\left\{\cos(6\theta - \alpha) + \cos\left(4\theta - \frac{2\pi}{3}k - \alpha\right)\right\} +$$

$$\frac{I_5}{2}\sum_{k=0}^{5}\left\{\cos\left(10\theta + \frac{2\pi k}{3} - \beta\right) + \cos\beta\right\}$$

$$= 3I_1\cos(6\theta - \alpha) + 3I_5\cos\beta.$$

Similarly, (1, 2) component is expressed as:

$$(1, 2) \text{ component} = -3I_1 \sin(6\theta - \alpha) - 3I_5 \sin\beta \tag{32}$$

If equations (31) and (32) are integrated with a period of N of the fundamental wave component, the ripple included in these equations (31) and (32) is eliminated so that (1, 1) component $\propto I_5 \cos\beta$ - - - (33) and (1,2) component $\propto I_5 \sin\beta$ - - - (34) are given. Consequently, the phase and amplitude of d-axis and q-axis fifth-order higher harmonic wave components with respect to the fifth-order magnetic flux can be determined.

Figure 2A:
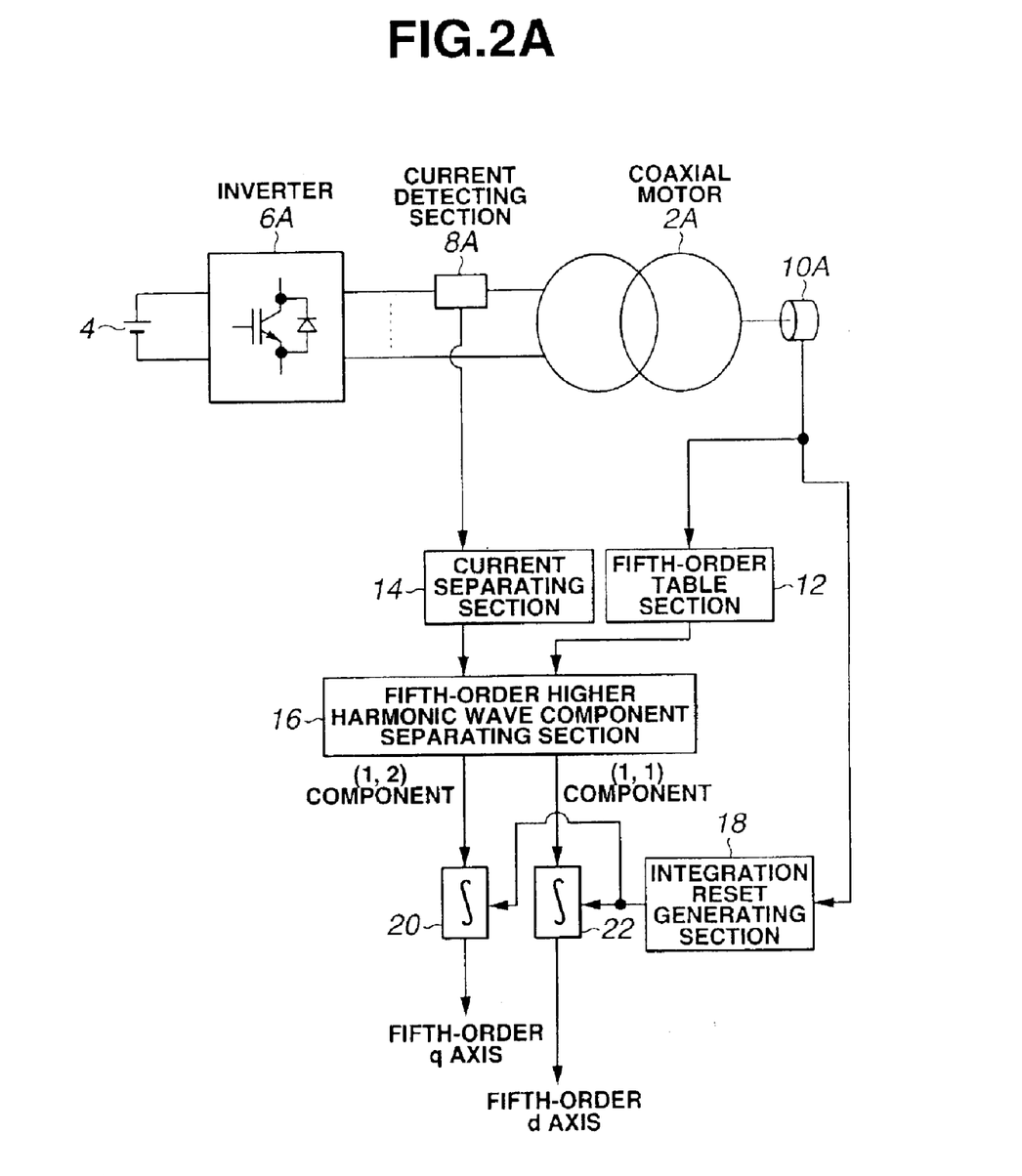
FIG. 2A is a circuit block diagram of an example of a structure to separate higher harmonic wave current components from a compound current.

FIG. 2A shows a functional block diagram of a structure of a motor control circuit to separate the higher harmonic wave components and to obtain d-axis and q-axis components of the fifth-order high harmonic wave current component. An inverter 6 having six transistor couples Tr1 through Tr12 (refer to FIG. 2B) is connected to coaxial motor 2 such as shown in FIGS. 1A, 1B, 1C, 1D, and 1E having the inner and outer rotors R1 and R2 via each terminal (T1 through T6). Inverter 6 is connected across a DC power supply 4 and a capacitor C. The compound current on which the fifth-order higher harmonic wave components are superposed generated by inverter 6 receiving a DC current from DC power supply 4 is supplied to coaxial motor 2. It is noted that since current processing for inner rotor R1 and outer rotor R2 are mutually the same, the current processing for only inner rotor R1 will be described herein.

A portion at which the separation of the higher harmonic wave components is carried out includes: a current detecting section 8A interposed in a feeder between inverter 6 and coaxial motor 2A; a current separating section 14 connected to current detecting section 8A; an inner rotor position detecting section 10A attached onto inner rotor R1 (specifically, inner rotor shaft 9); a fifth-order table section 12 connected to inner rotor position detecting section 10A; a fifth-order higher harmonic wave component separating section 16 which is connected to current separating section 14 and fifth-order table section 12; an integration reset generating section 18 connected to the rotor position detecting section 10, and integration sections 20 and 22 connected to fifth-order higher harmonic component separating section 16 and integration reset generating section 18. Current detecting section 8 detects the actual compound (alternating) current supplied to coaxial motor 2A by means of inverter 6A and supplied to current separating section 14 to separates current components related to outer rotor R2. In this example, the current components only related to the inner rotor R1 are supplied to fifth-order higher harmonic wave separating section 16. It is noted that the inner rotor current components are expressed in equation (28). On the other hand, inner rotor position detecting section 10A detects a position of the inner rotor and detected value thereof is supplied to the fifth-order table section 12 and integration reset generating section 18. Fifth-order table section 12 stores a conversion matrix of equation (29) into which the position of inner rotor R1 received from rotor position detecting section 10A is substituted. This position data is supplied to fifth-order harmonic wave separating section 16. Fifth-order higher harmonic wave separating section 16 carries out the calculation of equation (28) multiplied by equation (30) from the current expressed by equation (29) received from current separating section 14 and conversion matrix expressed by equation (30) received from fifth-order table section 12, (1, 2) component is supplied to integration section 20. (1, 1) component is supplied to other integration section 22.

Figure 2B:
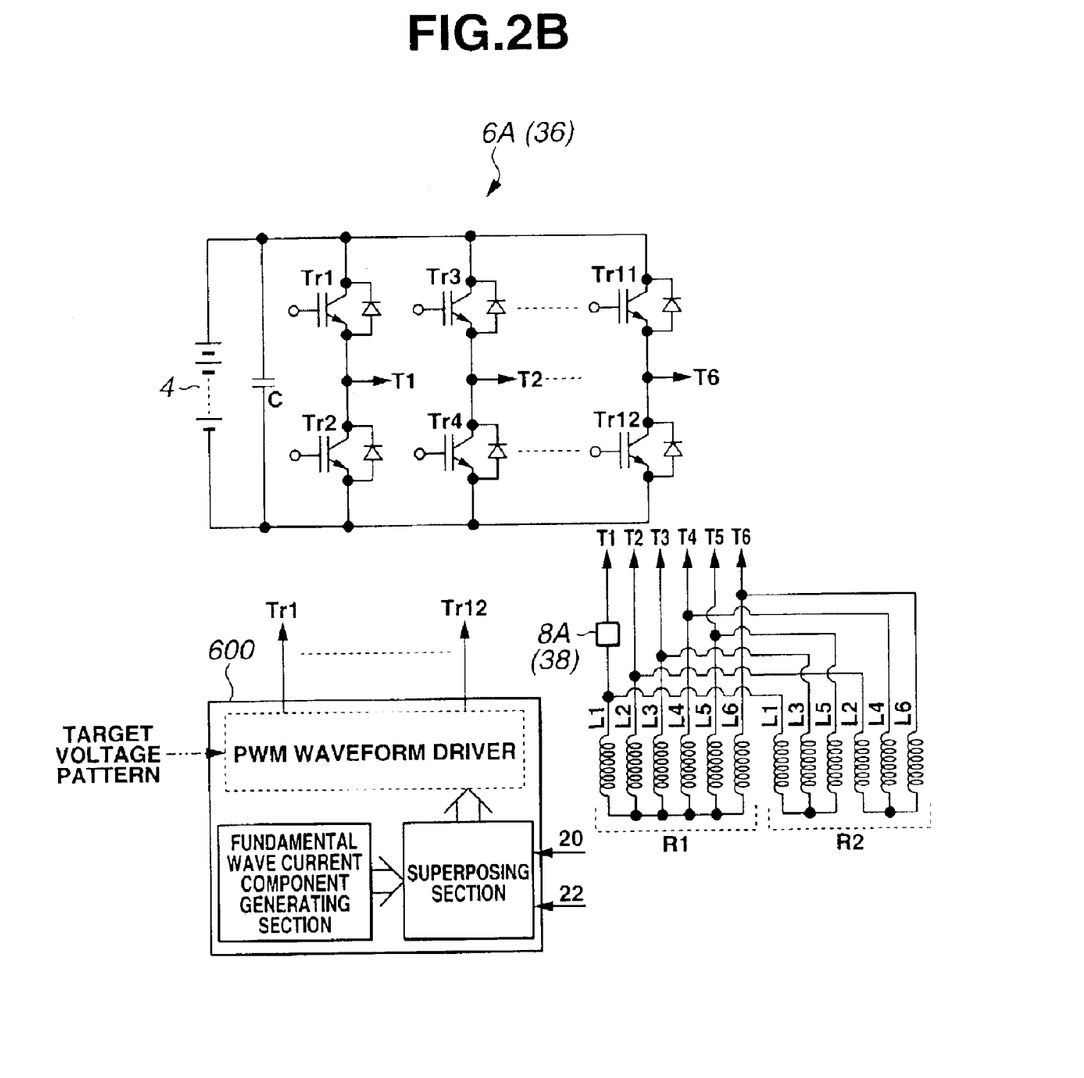
FIG. 2B is a circuit block diagram of an example of a structure of a motor control circuit related to the structure shown in FIG. 2A.

Integration reset generating section 18 develops an integration reset signal representing an N period of the fundamental wave on the basis of the position of the inner rotor received from rotor position detecting section 10 and supplied to integration sections 20 and 22. Integration reset generating section 18 develops an integration reset signal representing an N period of the fundamental wave on the basis of the position of the inner rotor received from inner rotor position detecting sections 20 and 22. These integration sections 20 and 22 perform integrations expressed as $$\int_0^T I^N \cos N\theta dt \text{ and } \int_0^T I^N \sin N\theta dt$$

wherein N (higher harmonic order number)=5. The integration section 22 integrates (1, 1) component received from fifth-order higher harmonic wave separator 16 with respect to N period of the fundamental wave on the basis of the integration reset signal received from integration reset generating section 18 and outputs the d-axis component of the fifth-order higher harmonic wave component defined as equation (33). In the same way as in the integration section 22 described above, integration section 20 outputs q-axis component of the fifth-order higher harmonic wave component. These d-axis and q-axis components of the fifth-order higher harmonic wave components are superposed by a superposing section of a controller 600 shown in FIG. 2B on the compound current generated by a fundamental wave current component generating section of controller 600 and supplied to the stator coil of the coaxial motor 2A.

Figure 3:
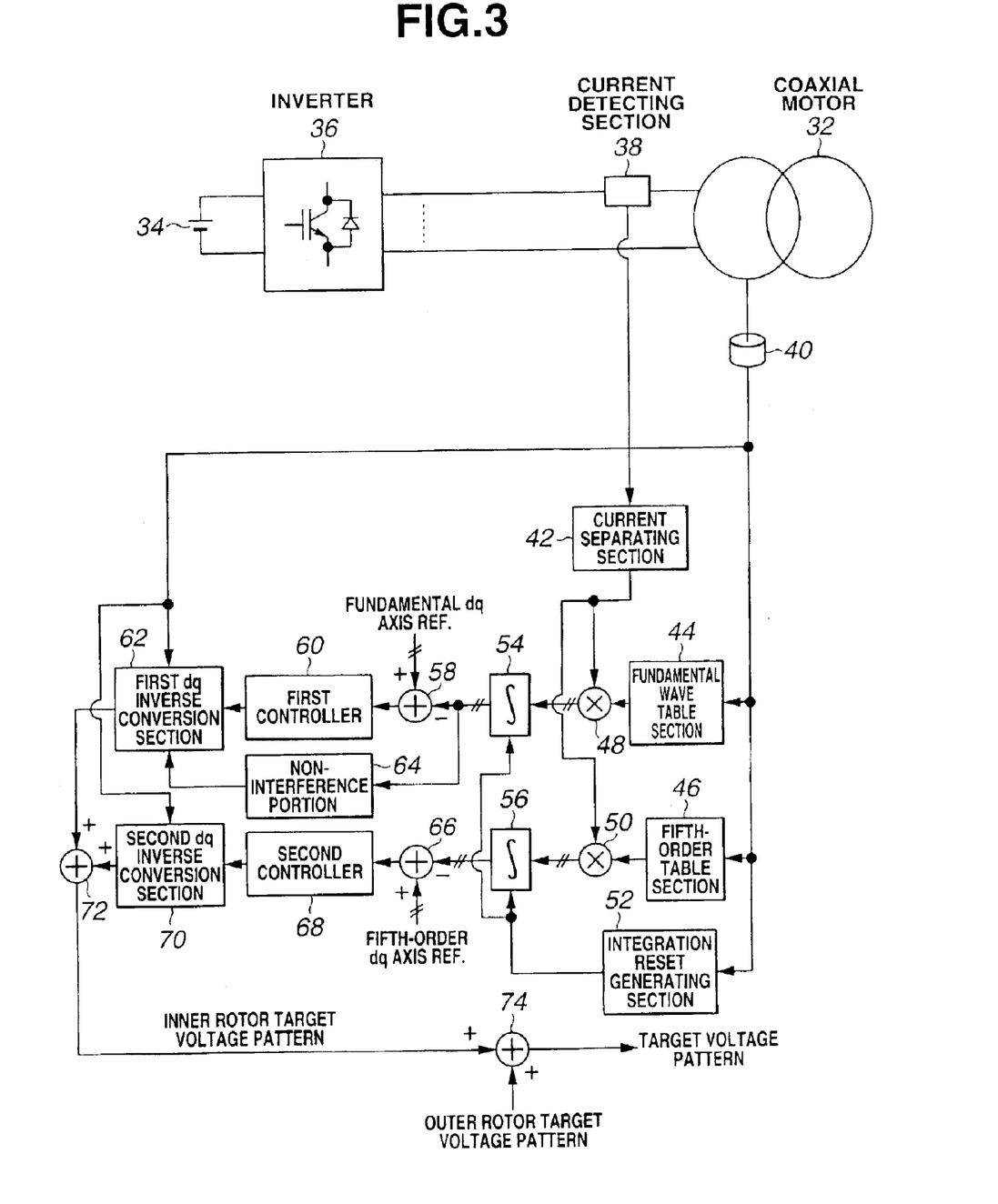
FIG. 3 is a block diagram of a structure of the motor control circuit in a case where a current controlling method for an electrical rotating machine according to the present invention is applicable to the coaxial motor shown in FIGS. 1A through 1E.

FIG. 3 shows a functional block diagram of the motor control circuit to obtain a target voltage pattern in a case where the current controlling method of the rotating machine according to the present invention is applicable to the coaxial motor such as shown in FIG. 1A.

Inverter 36 to which DC power supply 34 is connected is connected to coaxial motor 32 having inner rotor R1 and outer rotor R2. A compound current on which the fifth-order higher harmonic wave components generated by inverter 36 are superposed is supplied. The series of processing related to the inner rotor and outer rotor are mutually the same. Hence, the explanation only on the inner rotor will be made. Furthermore, in order to make a further simplification, portions related to d-axis component and q-axis component of the fundamental wave component and fifth-order one are integrated into one, respectively. A common part to the fundamental wave and fifth-order higher harmonic wave components includes current detecting section 38 inserted in one of feeders between inverter 36 and coaxial motor 32; current separating section 38 inserted in the feeder between inverter 36 and coaxial motor 32; an inner rotor position detecting section 40 attached onto inner rotor R1; and integration reset generating section 52 connected to rotor position detecting section 40. These elements are the same as those described with reference to FIG. 2A and are operated in the same manner. The portion related to the fundamental wave includes: fundamental wave table section 44 connected to rotor position detecting section 40; a first multiplier (fundamental wave separating section) 48 connected to current separating section 42 and fundamental wave table section 44; a first integrating section 54 connected to first multiplier 48 and integration reset generating section 52; a first adder 58; a first controller 60; a first d-q inverse conversion section 62; and a non-interference section 64. Since an operation of a portion related to the fundamental wave components is the same as the conventional portion, the detailed description will be omitted herein. An operation related only to the fifth-order higher harmonic wave component will be described below. A portion related to fifth-order higher harmonic wave component includes: fifth-order table section 46 connected to inner rotor position detecting section 40; a second multiplier (fifth-order higher harmonic wave separating section) 50; and a second integration section 56 connected to second multiplier 50 and integration reset generating section 52. The operation of these portions has been already explained with reference to FIG. 2A. A portion related to the fifth-order higher harmonic wave components further includes: a second adder 66 connected to second integrating section 56; a second controller 68 connected to second adder 55; and a second d-q inverse conversion section 70 connected to second controller 68 and inner rotor position detecting section 40. Second adder 66 adds fifth-order d-axis and q-axis component derived by second integrating section 56 to reference d-axis and q-axis components of the fifth-order higher harmonic wave current component and supplies the added result to second controller 68.

Second controller 68, for example, constituted by a PI (Proportional-Integration) integrator in the case of the fundamental wave component. Output signals of second controller 68 and rotor position detecting section 40 are supplied to second d-axis, q-axis inverse conversion section 70 in which an inverse conversion of d-axis-to-q-axis is carried out to obtain a target voltage pattern related to fifth-order higher harmonic wave component. A common portion to the fundamental wave component and fifth-order higher harmonic wave component furthermore includes: first d-axis, q-axis conversion section 62; a third adder 72 connected to first d-q inverse conversion section 62 and to second d-axis, q-axis inverse conversion section 70; and a fourth adder 74 connected to third adder 72. Third adder 72 adds the target voltage pattern related to the fundamental wave obtained from first d-axis, q-axis inverse conversion section 62 and the target voltage pattern related to the fifth-order higher harmonic wave component to obtain the target voltage pattern for the inner rotor R1. A fourth adder 74 adds the target voltage pattern for inner rotor R1 and a target voltage pattern for outer rotor R2 derived from the portion related to the outer rotor which is the same way as the portion related to inner rotor and the target voltage pattern related to coaxial motor 32.

Figure 1F:
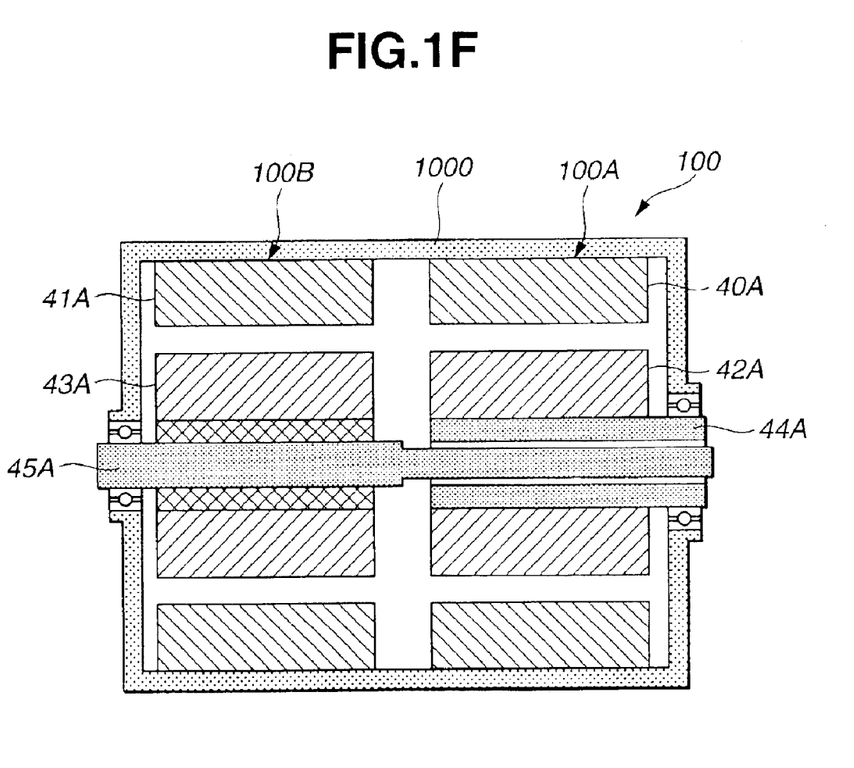
FIGS. 1F and 1G are cross sectional views of examples of stator-split type compound motors, respectively.
Figure 1G:
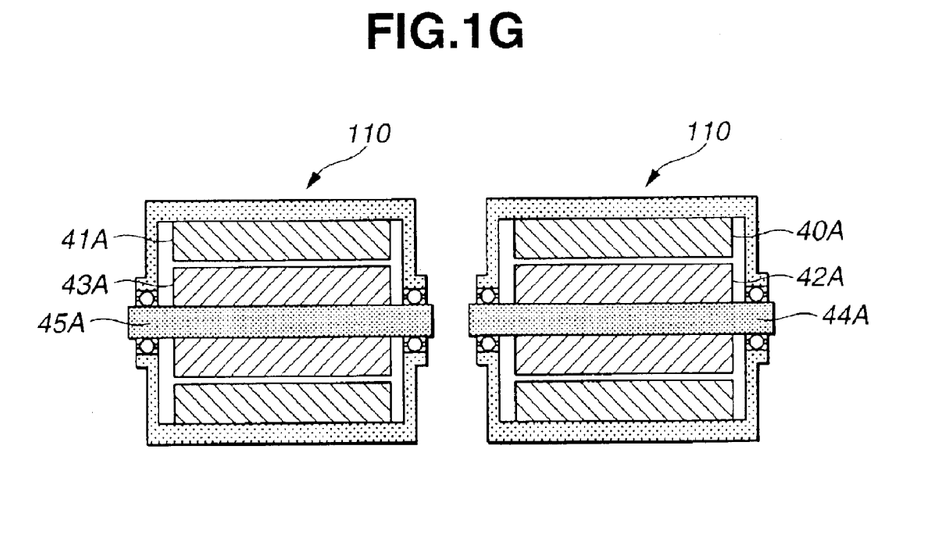
Figure 4:
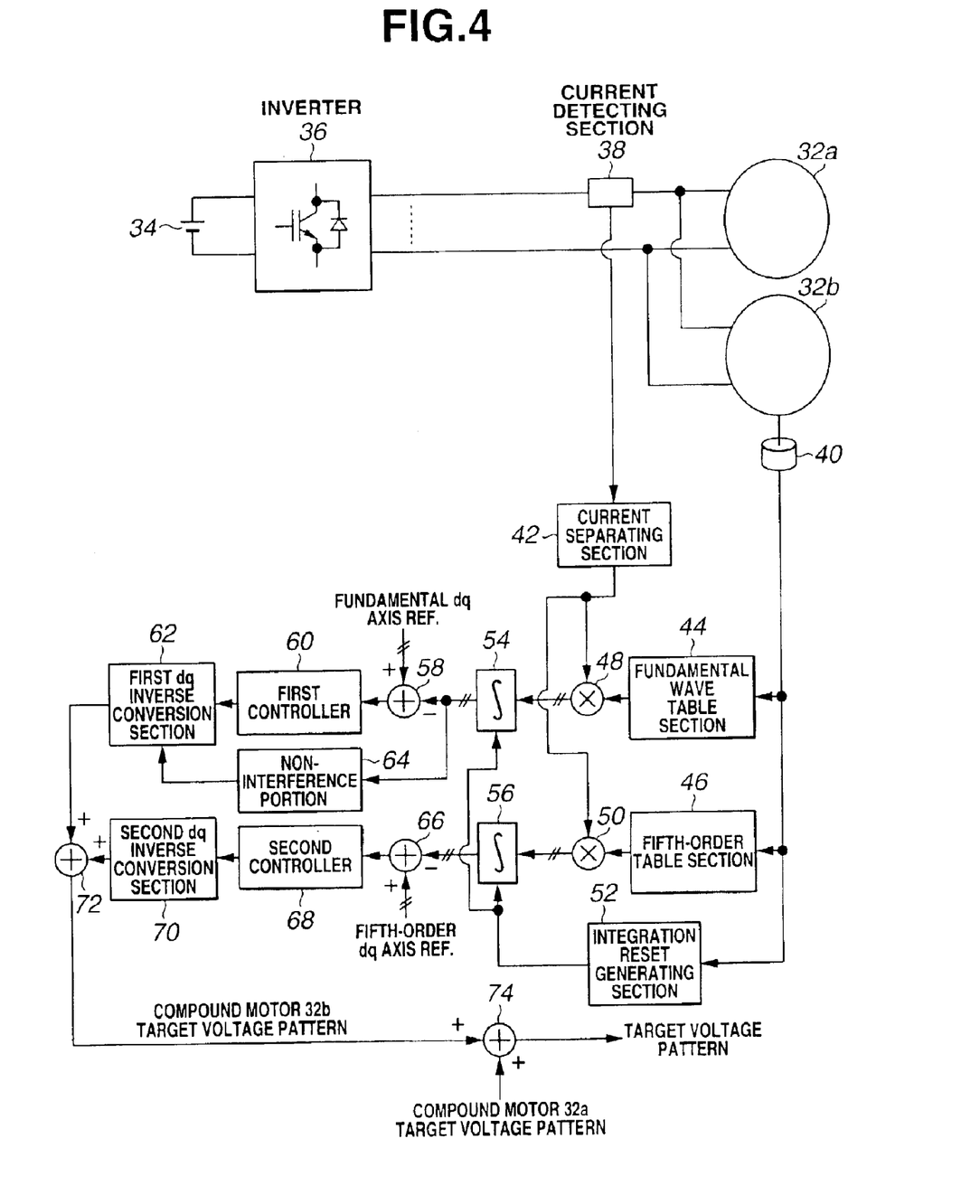
FIG. 4 is a block diagram of a structure of the motor control circuit in a case where a current controlling method for an electrical rotating machine according to the present invention is applicable to a compound motor having couples of a stator coil and a rotor separately and independently as shown in FIGS. 1F and 1G.

Next, FIG. 4 shows a block diagram of a structure of obtaining the target voltage pattern in the case where the rotating machine current controlling method according to the present invention is applicable to a compound motor having couples of the stator coil and the rotor, respectively independently. That is to say, the compound motor related to FIG. 4 is shown in FIG. 1F or FIG. 1G. The compound motor of a stator split type shown in FIG. 1F includes: a motor/generator 100 having a right stator 40A, a right rotor 42A faced toward right stator 40A, a right rotor shaft 44A rotatably supported by means of a bearing on an outer casing 1000 on which right stator 40A is attached, a left stator 41A, a left rotor 43A faced toward left stator 41A, a left motor shaft 45A which is coaxial with right motor shaft 44A and is rotatably supported by means of the bearing on outer casing 1000. Right motor shaft 44A is rotatable independently of left motor shaft 44A. As shown in FIG. 1G, the compound motor includes twin motor/generator units 110, each being mutually the same structure but is separated from each other with a space. In the compound motor, the same polarity coils of the two stator coils are connected in parallel to each other so that an ineffectual current is controlled and the whole working efficiency is improved. The structure shown in FIG. 4 is generally the same as shown in FIG. 3 except that the inner rotor R1 is replaced with one rotor (for example, right rotor 42A shown in FIG. 1F or FIG. 1G) and the outer rotor is the other rotor (for example, left rotor 43A shown in FIG. 1F or FIG. 1G. In addition, the operation of each part is the same as described with reference to FIG. 3. Hence, the detailed explanation of the blocks shown in FIG. 4 will be omitted herein.

Figure 5:
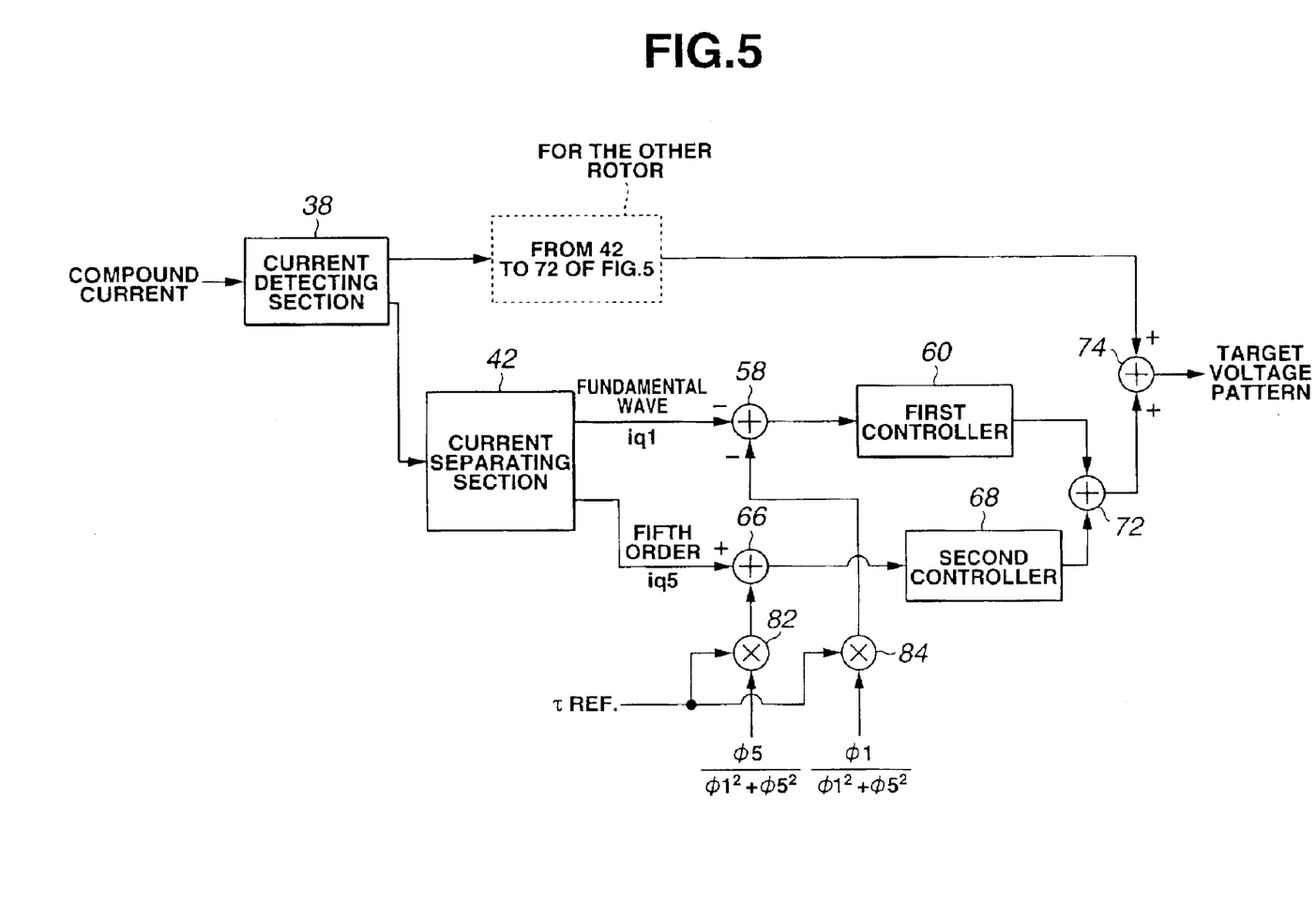
FIG. 5 is a block diagram for explaining fundamental wave and fifth-order higher harmonic wave reference currents shown in FIGS. 3 and 4.

FIG. 5 shows a functional block diagram of fifth-order higher harmonic wave current and fundamental wave current reference d-axis and q-axis components (generally called hereinbelow reference current) added to adders 58 and 66 shown in FIGS. 3 and 4, respectively.

FIG. 5 is only concentrated on the circuit blocks around adders 58 and 66 and the other circuit blocks are shown in FIGS. 3 and 4. The same reference numerals as those shown in FIG. 5 designates like elements shown in FIGS. 3 and 4. The reference currents are currents required to obtain predetermined torque τref. Hence, as described above in equation (13), the reference currents can be determined. Hence, as shown in FIG. 5, as far as the fifth-order higher harmonic wave component is concerned, a third multiplier 82 multiplies $\tau_{ref}$ with $\phi_5/(\phi_1^2+\phi_5^2)$ and supplies the reference current related to fifth-order higher harmonic component to adder 66. Similarly, as far as the reference current on the fifth-order higher harmonic wave component is concerned, a fourth multiplier 84 multiplies $\tau_{ref}$ with $\phi_1/(\phi_1^2+\phi_5^2)$ and the result of the multiplication is supplied from fourth multiplier 84 to adder 66. Consequently, general expressions of $i_k=$ $$\frac{\phi_k}{\sum \phi_k^2} \tau_{ref}$$

and $i=\Sigma i_k$ are determined, wherein $\tau_{ref}$ denotes a target axial torque, $\phi_k$ denotes a magnetic flux k-th order higher harmonic wave component, and i denotes the supplied current.

In FIG. 2B, controller 600 includes a PWM (Pulse Width Modulation) waveform driver connected to each base terminal of transistor couples Tr1 and Tr2 through Tr11 and Tr12 drives these transistor couples to generate fundamental wave components and d-axis and q-axis components of the fifth-order higher harmonic wave current components by means of fundamental wave current component generating section and fifth-order higher harmonic wave component superposing section. It is noted that the target voltage pattern shown in FIGS. 3 and 4 is supplied to the PWM waveform driver of controller 600.

The entire contents of a Japanese Patent Application No. 2002-044662 (filed in Japan on Feb. 21, 2002) are herein incorporated by reference. The scope of the invention is defined with reference to the following claims.

What is claimed is:

1. A method for controlling a current of an electrical rotating machine, the rotating machine comprising a plurality of rotors driven by a compound current, the method comprising:

superposing a sum of high-order higher harmonic wave currents having current components whose phases are different by 90 [el. deg] from respective magnetic flux higher harmonic waves caused by at least one magnets present on the respective rotors of the rotating machine and whose phases are the same as those of the respective magnetic flux higher harmonic waves on the compound current which is a sum of fundamental wave currents; and supplying the sum of the high-order higher harmonic wave currents superposed on the sum of the fundamental wave currents in the compound current to the rotating machine.

2. A method for controlling a current of an electrical rotating machine as claimed in claim 1, wherein high-order higher harmonic wave current components are separated through a higher harmonic wave current separating section from respective currents separated from the compound current supplied to the rotating machine through a current separating section and the current controlling method further comprises determining higher harmonic wave voltages in such a manner that phases and amplitudes of the separated higher harmonic wave current components become equal to respective predetermined target values, the higher harmonic wave voltages being added together to provide a target voltage.

3. A method for controlling a current of an electrical rotating machine as claimed in claim 2, wherein the separation of the current into the higher harmonic wave current components includes taking a product between a matrix defined in the following equation and the current before the separation thereof into higher harmonic wave current components, integrating a result of the product for an interval of time which is an integer L times a period of an electrical angle of the fundamental wave component:

$$\begin{pmatrix} \cos N\theta & \cos N\left(\theta - \frac{2\pi}{M}\right) & --- & \cos N\left(\theta - \frac{M-1}{M}2\pi\right) \\ -\sin N\theta & -\sin N\left(\theta - \frac{2\pi}{M}\right) & & -\sin N\left(\theta - \frac{M-1}{M}2\pi\right) \end{pmatrix}.$$

wherein θ denotes the electrical angle, M denotes a drive phase number, and N denotes an order number of the higher harmonic wave current components.

4. A method for controlling a current of a rotating machine as claimed in claim 3, wherein the compound current includes a six phase fundamental wave current component and a fifth-order higher harmonic wave current component expressed as follows:

$$I = I_1 \begin{pmatrix} \cos(\theta - \alpha) \\ \cos(\theta - 60 - \alpha) \\ \cos(\theta - 120 - \alpha) \\ \cos(\theta - 180 - \alpha) \\ \cos(\theta - 240 - \alpha) \\ \cos(\theta - 300 - \alpha) \end{pmatrix} + I_5 \begin{pmatrix} \cos(5\theta - \beta) \\ \cos(5\theta - 60 - \beta) \\ \cos(5\theta - 120 - \beta) \\ \cos(5\theta - 180 - \beta) \\ \cos(5\theta - 240 - \beta) \\ \cos(5\theta - 300 - \beta) \end{pmatrix},$$

wherein $I_1$ denotes an amplitude of the fundamental wave current components, I5 denotes an amplitude of fifth-order higher harmonic wave current components, θ denotes an electrical angle, α and β denotes initial phases of the fundamental wave current and fifth-order higher harmonic wave current components, and current controlling method comprises: multiplying the right side of the above equation by a conversion matrix to a d-q axis coordinate system described as follows:

$$\begin{pmatrix} \cos 5\theta & \cos(5\theta + 60) & --- & \cos(5\theta + 300) \\ -\sin 5\theta & -\sin(5\theta + 60) & --- & -\sin(5\theta + 300) \end{pmatrix}$$

to derive (1, 1) component=3I1 cos 6θ−α)+3I5 cos β and (1, 2) component=−3I1 sin (6θ−α)−3I5 sin β; integrating (1, 1) component and (1, 2) component for an interval of time corresponding to a period of N of the fundamental wave component to derive (1, 1) component ∝ I5 cos β and to derive (1, 2) component ∝ I5 sin β to determine phase and amplitude of d-axis and q-axis components of the fifth-order higher harmonic wave current component with respect to the fifth-order magnetic flux.

5. A method for controlling a current of an electrical rotating machine as claimed in claim 2, wherein the separation of the current into the higher harmonic wave current components includes: adding the current of drive phase number of M for every other current to detect N-th order higher harmonic wave current components when a relationship of 2×N×k/M=0, 1 ... (k=0 through M−1) is established;

and carrying out the following equation to detect the phases and amplitudes of the N-th order higher harmonic waves;

$$\int_0^T I^N \cos N\theta dt \text{ and } \int_0^T I^N \sin N\theta dt,$$

wherein T denotes an integer by which a period of the N-th order higher harmonic wave current components is multiplied.

6. A method for controlling a current of an electrical rotating machine as claimed in claim 2, wherein the separation of the current into the higher harmonic wave current components includes determining a current having 90 [el. deg] component with respect to the magnetic flux through the following equation in such a manner that a torque given in the separated higher harmonic wave current components is satisfied:

$$i_k = \frac{\phi_k}{\sum \phi_k^2} \tau_{ref}$$

and i=Σ$i_k$, wherein τref denotes a target axial torque, φk denotes a magnetic flux k-th order higher harmonic wave component, and i denotes the supplied current.

7. A method for controlling a current of an electrical rotating machine as claimed in claim 6, wherein k of the k-th number order higher harmonic wave components is ended at arbitrary N (N denotes a natural number).

8. A method for controlling a current of a rotating machine as claimed in claim 7, wherein k is 5.

9. A method for controlling a current of an electrical rotating machine comprising:
   superposing at least one high-order higher harmonic wave current on a fundamental wave current, the high-order higher harmonic wave current having current components one phase of which is different by 90 [el. deg] from a high-order high harmonic wave component included in a magnetic flux distribution generated by at least one magnet of the rotating machine and the other phase of which is the same as that of the high-order higher harmonic wave component included therein; and
   supplying the high-order harmonic wave current component superposed on the fundamental wave current to the rotating machine,
   wherein the rotating machine comprises a plurality of rotors driven by a compound current and wherein a sum of the high-order higher harmonic wave currents having current components whose phases are different by 90 [el. deg] from only respectively arbitrary N-th number order higher harmonic waves from among magnetic flux higher harmonic waves caused by the magnets present on the respective rotors and whose phases are the same as the respectively arbitrary N-th number order magnetic flux higher harmonics caused thereby are superposed on the compound current which is a sum of fundamental wave current components.

10. A method for controlling a current of a rotating machine, comprising:
   superposing at least one high-order higher harmonic wave current on a fundamental wave current, the high-order higher harmonic wave current having current components one phase of which is different by 90 [el. deg] from a high-order high harmonic wave component included in a magnetic flux distribution generated by at least one magnet of the rotating machine and the other phase of which is the same as that of the high-order higher harmonic wave component included therein; and supplying the high-order harmonic wave current component superposed on the fundamental wave current to the rotating machine, wherein the rotating machine comprises two compound motors, each motor independently having a stator coil and a rotor, in which an ineffectual current is controlled to improve a whole working efficiency in a case where the coils of the same polarity are connected in parallel to each other in two stator coils.

11. An apparatus for controlling a current of an electrical rotating machine, the rotating machine comprising a plurality of rotors driven by a compound current, the apparatus comprising:

a superposing section that superposes a sum of high-order higher harmonic wave currents having current components whose phases are different by 90 [el. deg] from respective magnetic flux higher harmonic waves caused by magnets present on the respective rotors of the rotating machine and whose phases are the same as those of the respective magnetic flux higher harmonic waves on the compound current which is a sum of fundamental wave currents; and a supplying section that supplies the sum of the high-order higher harmonic wave currents superposed on the sum of the fundamental wave currents in the compound current to the rotating machine.

* * * * *